(12) United States Patent
Schwartz et al.

(10) Patent No.: US 9,035,604 B2
(45) Date of Patent: May 19, 2015

(54) CURRENT SENSING CIRCUIT DISCONNECT DEVICE AND METHOD

(71) Applicants: Robert M. Schwartz, Miami, FL (US);
Peter M. Hockman, Miami, FL (US);
Gregg M. Connary, Boynton Beach, FL (US)

(72) Inventors: Robert M. Schwartz, Miami, FL (US);
Peter M. Hockman, Miami, FL (US);
Gregg M. Connary, Boynton Beach, FL (US)

( * ) Notice: Subject to any disclaimer, the term of this patent is extended or adjusted under 35 U.S.C. 154(b) by 0 days.

(21) Appl. No.: 13/892,509

(22) Filed: May 13, 2013

(65) Prior Publication Data

US 2013/0285622 A1 Oct. 31, 2013

Related U.S. Application Data

(63) Continuation-in-part of application No. 12/843,151, filed on Jul. 26, 2010, now Pat. No. 8,456,137.

(60) Provisional application No. 61/288,213, filed on Jul. 24, 2009.

(51) Int. Cl.
*H02J 7/00* (2006.01)
*H02J 3/00* (2006.01)
*H01F 27/42* (2006.01)
*H02H 3/00* (2006.01)
*H02H 1/00* (2006.01)
*H02J 9/00* (2006.01)

(52) U.S. Cl.
CPC ............. *H02J 7/0052* (2013.01); *H02J 7/0042* (2013.01); *H02J 9/005* (2013.01); *H02J 2009/007* (2013.01)

(58) Field of Classification Search
USPC .................. 320/108, 128; 307/17, 66, 104; 361/102, 114
See application file for complete search history.

(56) References Cited

U.S. PATENT DOCUMENTS

| | | | | |
|---|---|---|---|---|
| 3,586,870 A | * | 6/1971 | Cwiak | 307/66 |
| 3,667,024 A | * | 5/1972 | Deming | 318/674 |
| 4,272,806 A | * | 6/1981 | Metzger | 363/21.17 |
| 5,315,533 A | * | 5/1994 | Stich et al. | 700/298 |
| 5,579,197 A | * | 11/1996 | Mengelt et al. | 361/93.4 |
| 6,028,413 A | | 2/2000 | Brockmann | |
| 6,069,803 A | * | 5/2000 | Cross | 363/21.14 |
| 6,339,314 B1 | | 1/2002 | Bruning | |
| D587,192 S | | 2/2009 | McGinley et al. | |
| D587,193 S | | 2/2009 | McGinley et al. | |
| D611,416 S | | 3/2010 | McGinley et al. | |
| 7,910,833 B2 | | 3/2011 | McGinley et al. | |
| 7,910,834 B2 | | 3/2011 | McGinley et al. | |
| 7,960,648 B2 | | 6/2011 | McGinley et al. | |

(Continued)

FOREIGN PATENT DOCUMENTS

| | | |
|---|---|---|
| WO | 88/06814 | 9/1988 |
| WO | 2011/129995 | 10/2011 |

*Primary Examiner* — M'Baye Diao
(74) *Attorney, Agent, or Firm* — Robert M. Schwartz

(57) ABSTRACT

A device and method are provided for saving power and electricity in a charging device such for external power supplies and battery chargers having a primary circuit and a secondary circuit where a switch is located in the primary circuit and a current sensing device in the secondary circuit to sense when there is a drop in current in the secondary circuit or no current in the secondary circuit because the load or a cell phone is charged and when this occurs the switch in the primary circuit is opened and the primary circuit no longer draws power from the source of power until the switch in the primary circuit is closed by activation of a user of the charging device.

20 Claims, 11 Drawing Sheets

(56) References Cited

U.S. PATENT DOCUMENTS

| | | |
|---|---|---|
| 8,242,359 B2 | 8/2012 | McGinley et al. |
| 2005/0276079 A1* | 12/2005 | Park et al. ................. 363/21.14 |
| 2008/0007878 A1* | 1/2008 | Gandolfi et al. ................ 361/42 |
| 2009/0289596 A1 | 11/2009 | McGinley et al. |
| 2009/0295233 A1 | 12/2009 | McGinley et al. |
| 2010/0001685 A1 | 1/2010 | Eastlack |
| 2010/0041262 A1 | 2/2010 | Chesneau |
| 2010/0225273 A1 | 9/2010 | Eastlack |
| 2011/0050170 A1 | 3/2011 | Eastlack |
| 2011/0260055 A1 | 10/2011 | McGinley et al. |
| 2012/0062182 A1 | 3/2012 | Rimdzius et al. |
| 2012/0326502 A1 | 12/2012 | Nguyen et al. |
| 2013/0187596 A1 | 7/2013 | Eastlack |
| 2013/0187597 A1 | 7/2013 | Eastlack |

* cited by examiner

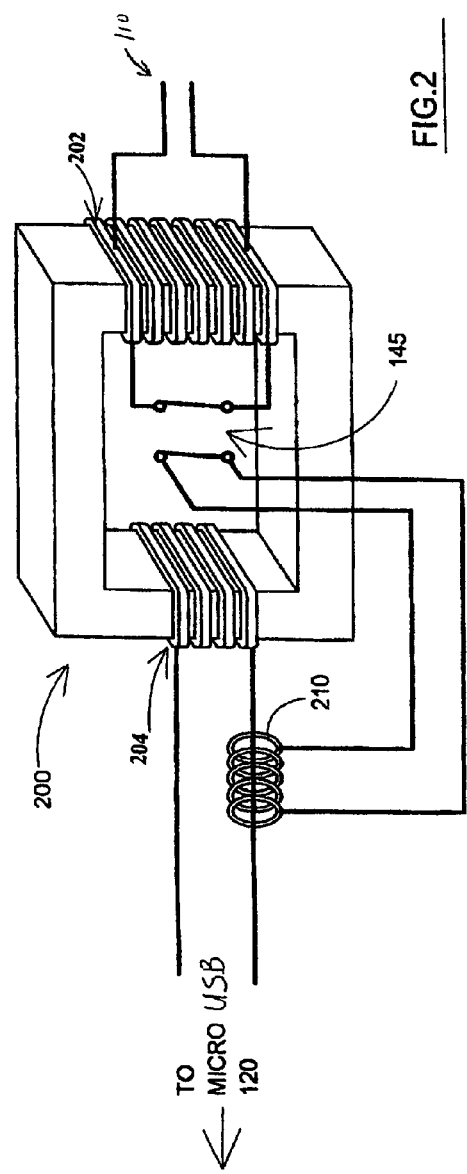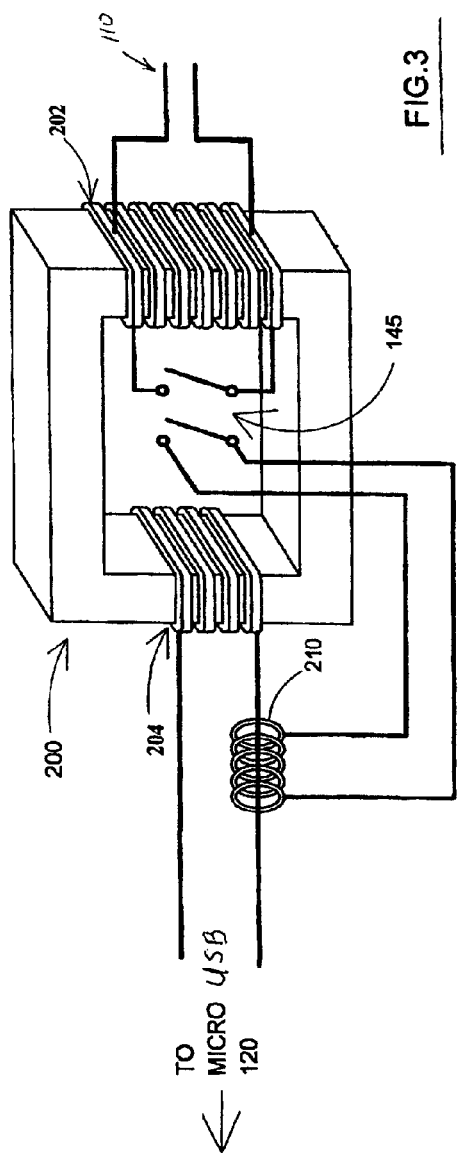
FIG.2
FIG.3

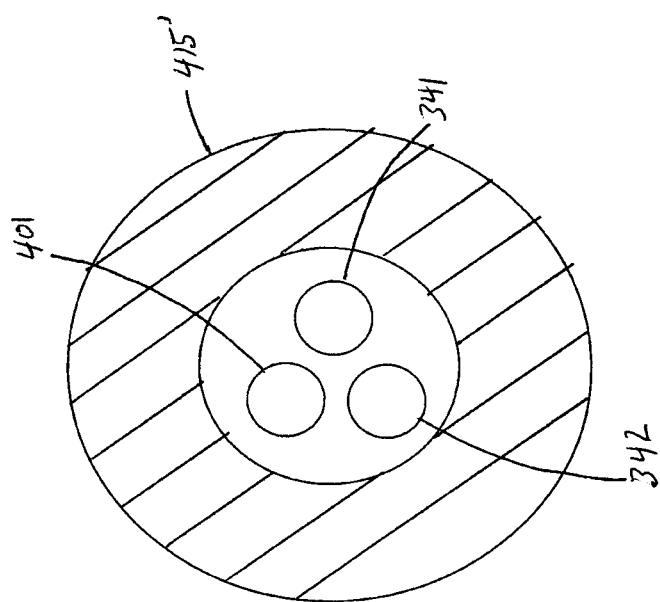
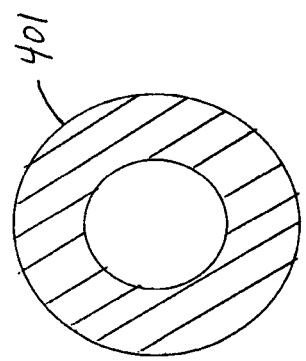

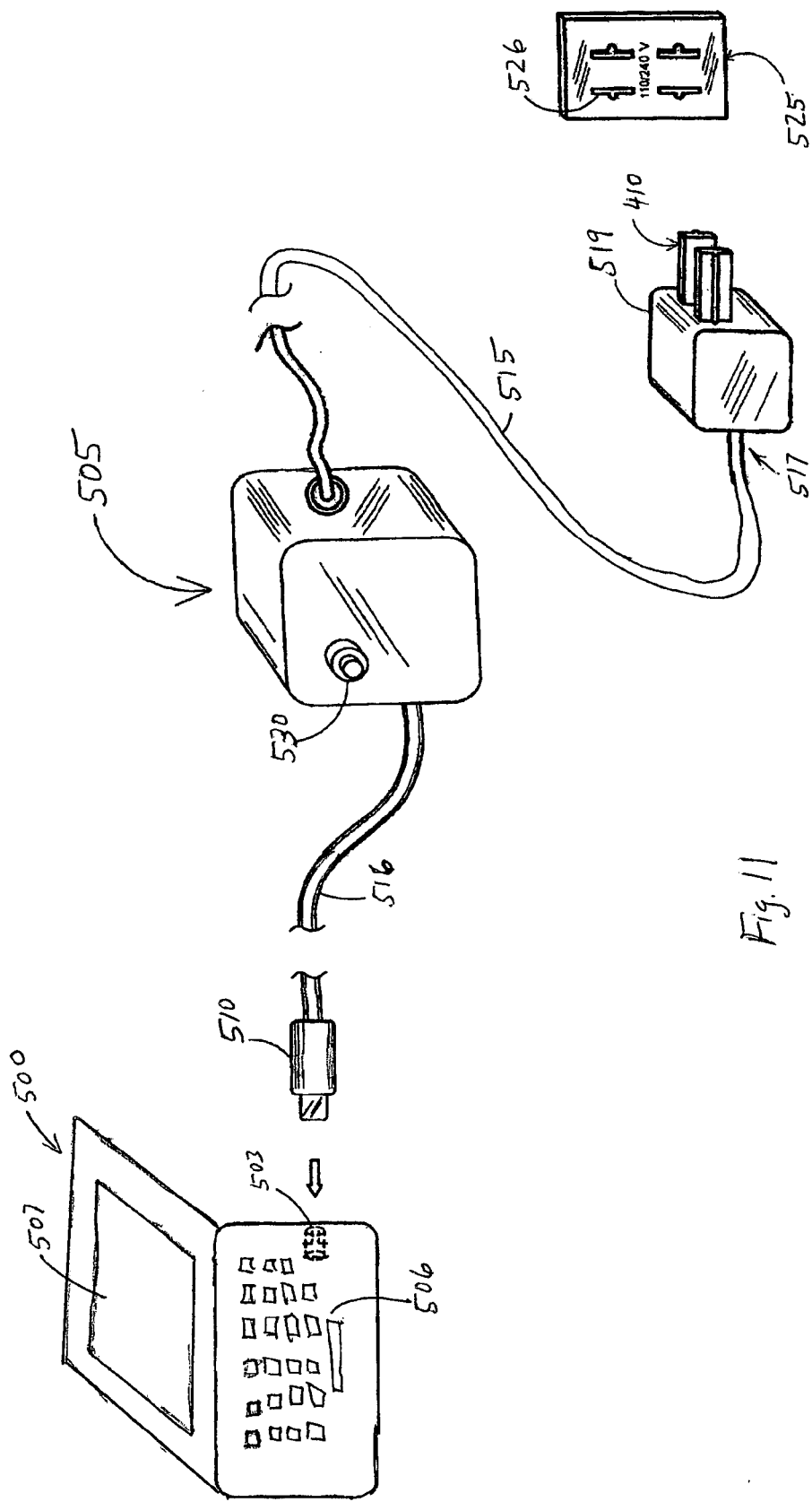

CURRENT SENSING CIRCUIT DISCONNECT DEVICE AND METHOD

CROSS-REFERENCE TO RELATED APPLICATIONS

This application is a continuation-in part-application of co-pending U.S. patent application Ser. No. 12/843,151 filed Jul. 26, 2010, entitled Current Sensing Circuit Disconnect Device and Method, which claims priority from U.S. Provisional Application No. 61/228,213 filed on Jul. 24, 2009, the disclosures of those applications being incorporated herein, by reference, in their entireties.

FIELD OF THE INVENTION

The invention relates to battery charging devices and external power supplies, hereinafter also jointly referred to as "charging devices", and methods for disconnecting these charging devices from the mains or the electrical power source in order to eliminate or minimize the flow of current into the charging device when these charging devices and power supplies are still plugged in or connected to the mains, but are no longer charging or providing power to a load. In accordance with the present invention, the charging device is effectively disconnected from the mains when there is a reduction or cessation of current flow sensed in the load circuit.

DESCRIPTION OF THE RELATED ART

Recently, significant concerns have been raised regarding the environmental impact of wasted electricity. In particular the use of energy by devices standing in idle mode or standby mode has been criticized as using electricity to no purpose, and thus wasting electricity and the valuable resources used to generate it.

One particular example of wasted energy occurs with battery chargers and external power supplies (hereinafter charging devices) of all kinds, including those associated with such devices as laptop computers, tablet computers, power tools, electric toothbrushes and portable, mobile and/or cellular telephones, as well as other devices that include a battery to be charged. These charging devices exhibit two distinct low power modes that utilize energy even when there is no load connected to the charging device or battery to be charged. These modes are generally referred to as "standby" and "idle". "Standby" mode occurs when a charging device is plugged into an outlet or the mains, but there are no batteries or load connected to the charger (i.e., no load connected to the charging device). For example, this occurs when a cell phone charging device is plugged into the wall or the mains, but the cell phone is not connected to the charger.

"Idle" mode occurs when no charging is taking place because the battery attached to the charging device is fully charged. In this situation, the charging device is connected between the mains and the load or device to be charged, and the load or device, typically a smart device, is charged and, therefore, is no longer charging. As a result the load draws no current from the charging circuit, but the charging device is still connected to the mains and there is typically power wasted in the primary circuit of the charging device. It is believed that billions of kW hours are currently wasted by battery charging devices running in the standby and idle modes. At present, people, users of charging devices, are being encouraged to physically unplug these charging devices from the mains when not in use, so as to reduce the amount of electricity wasted.

What is needed is a device that can be used to cut-off the electricity usage of devices, and in particular, of charging devices, operating in the standby and idle modes or similar modes of operation.

What is also needed is a way to reconnect a disconnected charging device when the primary circuit has been disconnected, or is open.

SUMMARY OF THE INVENTION

It is accordingly an object of the present invention to provide a device that can be added to, or incorporated in, battery charging devices to disconnect or mechanically break the primary circuit connected to the mains when the charging device is determined to be in a standby or idle mode of operation.

It is another object of the invention to reconnect the charging device to the mains after it has been disconnected.

In one particular embodiment of the invention, the charging circuit includes a circuit interrupter in the primary circuit and a switch to reconnect the primary circuit to the mains after it is has been interrupted. Such a switch can be located either in the portion of the charging device plugged into the mains, or in or near the portion of the charging device that is plugged into (i.e., mated with) the load or the device to be charged.

In one particular embodiment of the invention, the switch is a manual switch that reconnects the charging device to the mains after the charging device circuit has been interrupted, thus effectively disconnecting the charging device from the mains.

In another embodiment of the invention, the switch does not require electrical power to close the circuit and reconnect the charging device.

In another particular embodiment of the invention, a switch is provided to reconnect the charging device to the mains after the charging device has been disconnected, which switch is closed using a fluidic tube in communication with the switch that interrupts or reconnects the primary circuit.

In a further particular embodiment of the invention, a switch is provided to reconnect the primary circuit of the charging device to the mains after the circuit has been interrupted, which switch uses a power source to reconnect the charging device where that power source is either a battery at the charging device or any residual battery power remaining in the load.

Other features which are considered as characteristic for the invention are set forth in the appended claims.

Although the invention is illustrated and described herein as embodied in a current sensing circuit disconnect device and method, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 2 is a partial circuit diagram illustrating one particular embodiment of the instant invention wherein current is flowing in the primary side and secondary side of a transformer with the switches in a closed position as long as current flow is above a threshold in the secondary side of the transformer;

FIG. 3 shows the partial circuit diagram of FIG. 2, having the switches in an open position in accordance with one particular embodiment of the instant invention and no current flowing on the primary side or secondary side of the transformer because the coil does not sense current above a threshold in the secondary side of the transformer;

FIG. 9 is a cross section of fluidics tube useful with the circuit of FIG. 8.

FIG. 10 is a cross section of a charging cord with the fluidics tube there-within.

FIG. 11 shows a further embodiment of the invention wherein a charging device is provided for charging a laptop computer.

DESCRIPTION OF THE PREFERRED EMBODIMENTS

Figure 1:
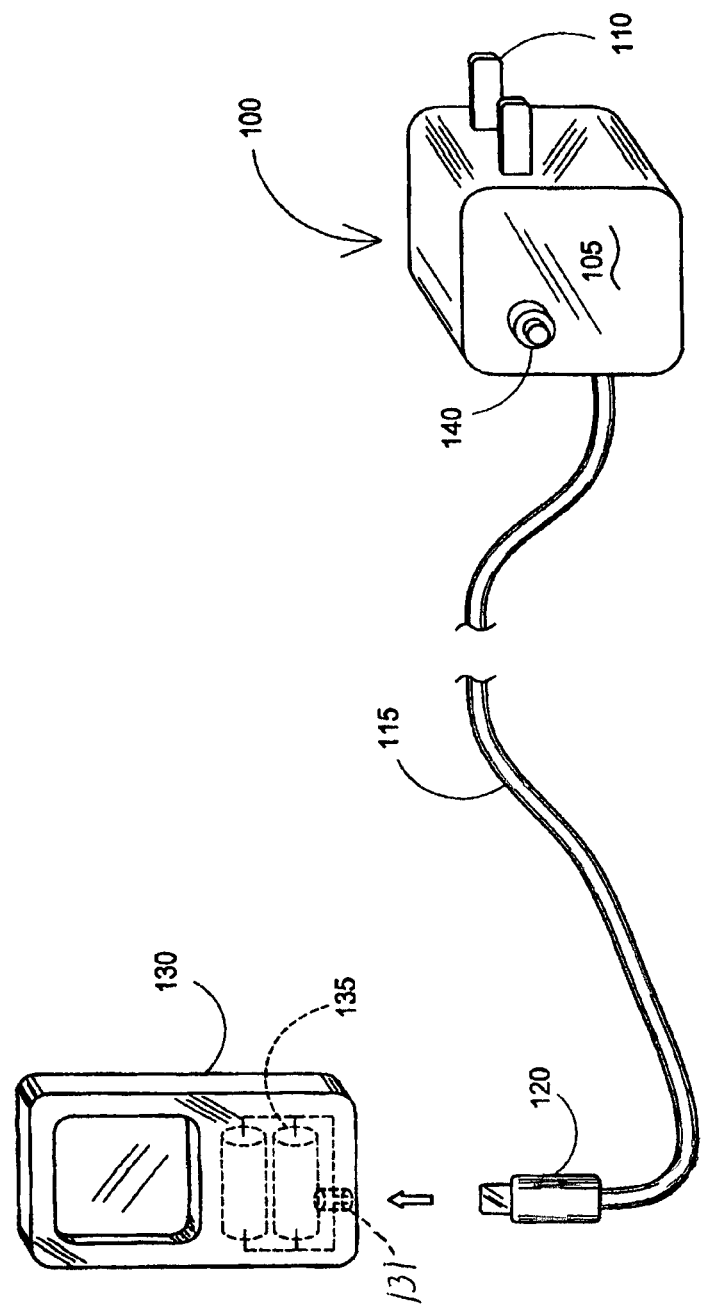
FIG. 1 is an isometric view of a charging device in accordance with one particular embodiment of the instant invention and a load, such as a portable cell phone.

Referring now to FIGS. 1 to 3, there is shown an illustration of a charging device 100 made in accordance with one particular embodiment of the instant invention. In the particular example shown in FIG. 1, the charging device 100 is a cell phone charger incorporating the traditional mobile phone charger elements. This is not meant to be limiting, as it will be seen how the present invention can be adapted for other kinds of charging devices (i.e., for rechargeable batteries, laptop computers, tablet devices, power tools, rechargeable toothbrushes, etc.) that may operate in standby and idle modes.

Referring back to FIGS. 1 to 3, the charger 100 includes a plug 110 that permits the charging device 100 to be plugged into, and coupled with, and charged through, a wall outlet (not shown in this Fig. shown in FIG. 11 wall socket 525). Thus, the charging device 100 is connected to mains, which in the United States is 110/120V AC. In the present particular embodiment, a charging device 100, as shown, takes the 120 AC and down converts it, using a transformer 200 having a magnetic core with a primary coil 202 for connection to the 110/120 volt alternating current in the wall outlet or mains and a secondary coil 204. The charging device 100 further includes a jack or connector 120, such as a micro USB connector that connects to a load or cell phone 130, that provides a DC charging voltage to a load device, which, in the present example, is phone 130, when the connector 120 is connected in mating receptacle 131 at the base of phone 130. As such, the charging circuit of the charging device 100 also includes an AC/DC converter (not shown) connected to the secondary of the transformer 200, to convert the down-converted AC to DC, so as to provide a DC charging current from the connector 120 to the load device—phone 130.

Note that the connector 120 may be any form of connector or jack, as desired to connect the phone 130 to the charger 100. However, in the presently described embodiment, the connector 120 is illustrated as a micro-USB connector, in accordance with the recently introduced universal cell phone charger agreement. The connector 120 is shown as being at a distance from the body 105 of the charging device 100, but note that such distance can be as small or as large as desired. In particular, in one embodiment, the cord 115 is only a few inches, and it is envisioned that the plug 110 will be connected to a wall outlet via an extension cord. Alternately, the cord 115 can be several feet in length, so that the plug 110 can be directly plugged into an outlet, while the connector 120 is spaced from the outlet.

In accordance with one particular embodiment of the instant invention, the body 105 of the charging device 100 additionally includes a manually actuable, mechanical reset button 140, that may include an indicator light that the charger is active, that is used to manually reset a switch 145 triggered by the circuit of the instant invention. Referring more particularly to FIGS. 2 and 3, the instant invention operates on the principle of mechanically breaking or opening (i.e., interrupting) the electrical circuit between the wall outlet and the primary coil 202 of the transformer 200 when it is determined that no, very low current or a threshold current is being drawn by the secondary coil 204 of the transformer 200. Once the electrical circuit is interrupted at this location, the circuit will not be able to draw any more current until the mechanical button 140 is manually reset, thus closing the switch 145. In other words, while the primary circuit is interrupted, no current will be drawn by the charging device 100 until the primary circuit connection is restored by manual actuation of the button 140. Alternatively, the disconnection and then reconnection of the load can trigger the reconnection or closing of the primary circuit.

In the present particular embodiment, a current sensing device such as a current sensing coil 210 or resistance, is placed in close proximity to, or in the path from, the output wires of the secondary coil 204 of the transformer 200. Alternately, the current sensing device 210 can be placed after the AC/DC converter, if desired. When a mobile phone or cell phone 130 is initially connected to the connector 120, the charging device 100 is in or will be in the active mode, and current is drawn from the secondary until the battery 135 of the mobile phone 130 connected to the charging device 100 is fully charged. The current sensing device 210 measures the current being drawn over the cord 115 and, for so long as current is being drawn via the connector 120, the current sensing device 210 provides an output that maintains the switch 145 closed. However, once the battery 135 is fully charged, or the phone 130 is disconnected from the connector 120, current ceases to be drawn from the secondary coil 204 of the transformer 200 over the cord 115. Once the current sensing device 210 senses that the current draw has dropped off significantly or even that no current is being drawn by the load device at the connector 120, the current sensing device 210 signals the switch 145 to open. Thus opening the connection between the primary coil 202 of the transformer 200 and the plug 110, and interrupting the primary-side circuit. When the switch 145 is open, the charger 100 has an open circuit and no power is used thereby. To restart or close the circuit, the user must reconnect the load device—i.e., phone 130—in need of a charge by connecting the load device to the jack 120 if not already connected, and manually actuating the reset button 140, thus closing the switch 145 and reconnecting the primary coil 202 to the household AC mains. The switch 145 breaks or opens the circuit connection between the household mains and the primary coil 202 of the transformer 200 without necessitating the charger 100 being unplugged from the wall or the mains.

Additionally, the switch 145 is illustrated as double-pole double-throw mechanical switch in FIGS. 2 and 3, but any type of switch or relay that can be operated to open the circuit between the primary coil 202 of the transformer 200 and the plug 110 can be used. For example, a relay can be provided in place of switch 145, which relay is energized by the output of the current sensing device 210, and which normally opens when current is not provided from the current sensing device 210 (i.e., when there is no current drawn from the secondary coil 204). Further, additional circuitry can be provided to open the switch 145 once the current sensed by the current sensing device 210 drops below a predetermined level.

Figure 4:
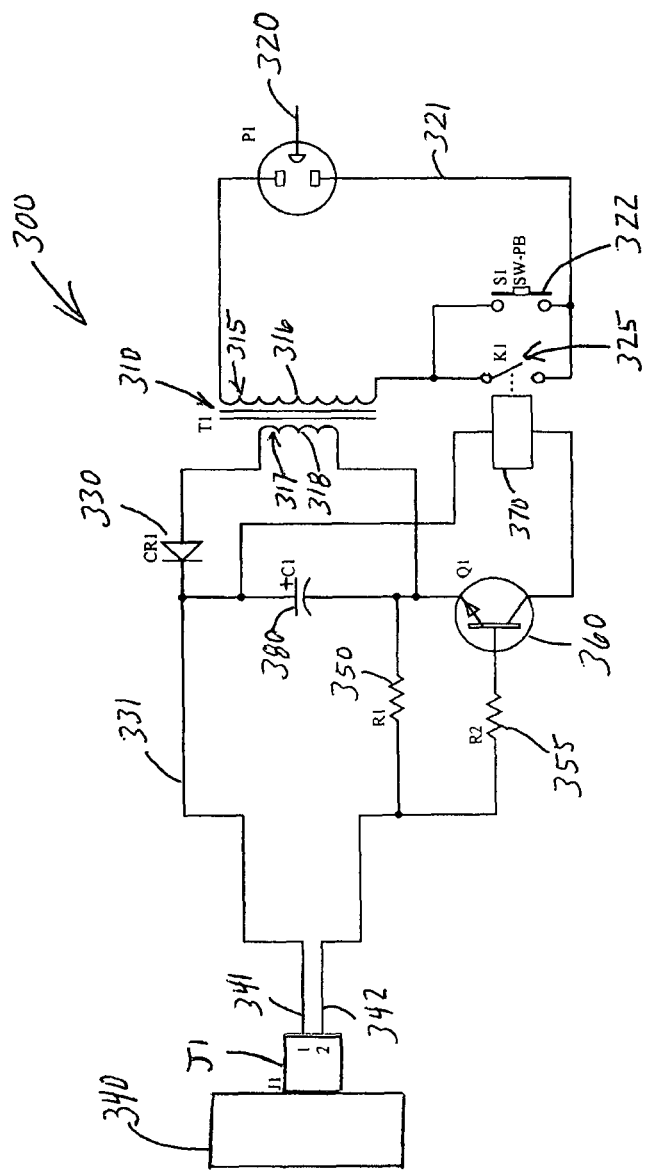
FIG. 4 is a circuit diagram showing one embodiment of the present invention wherein the mechanical switch is an electro-mechanical switch that interrupts the primary side circuit of the charging device in order to open and disconnect the primary side circuit from the mains and a momentary switch in the primary side circuit to reconnect the charging device once disconnected.

Referring now to FIG. 4, there is shown another embodiment of the present invention, wherein the mechanical switch (145 of FIGS. 2 to 3) is represented by the electro-mechanical switch/relay K1. More particularly, FIG. 4 is a partial circuit diagram for a charging device 300, which is substantially similar to the operation of the heretofore described circuit and charging device 100 of FIG. 1. Transformer 310 has a primary side 315 and a secondary side 317. Plug 320 connects the primary side 315 of transformer 310 to the mains (110 volt wall outlet or other wall outlet voltages, such as 220 volts, see a wall outlet as shown in FIG. 11). On the primary side 315, the primary side circuit 321 includes a primary coil 316, a manually actuable button 322, a relay or other electro-mechanical switch K1 including a relay contact 325, and plug 320.

The secondary side 317 of transformer 310, includes a secondary coil 318, a diode rectifier 330, a connector or jack J1 for connection to a load 340, having a first pin 341 and a second pin 342, a first resistor 350, a second resistor 355, a transistor 360, a coil 370, part of the relay K1, a secondary side circuit 331 and a filter capacitor 380. Transistor 360 is configured to operate as a solid-state switch that controls the state of the relay K1. For example, when current is being drawn by a load 340, the transistor 360 is saturated and current flows through the coil 370, closing the relay contact 325 in the primary side circuit 321. Please note that the use of a transistor for the switch 360 is not meant to be limiting, as the relay K1 can be controlled by another type of solid state switch or other similar electrical devices, such as, but not limited to, an FET switch, a zener diode or other switching logic device.

Transformer 310 can be a high frequency transformer or a 60 cycle line voltage step down transformer from 110 volts to 5 to 6 volts alternating current. From the secondary side 317 of transformer 310 the current is rectified by diode rectifier 330. The current then flows through load/device 340 such as a cell phone and the bulk of the current flows through shunt resister 350. Capacitor 380 filters the rectified DC current to the load 340.

When the voltage is the same across resistor 350 and resistor 355 then at the Q1 junction of transistor 360 the emitter is on and current flows and magnetic coil 370 is energized, holding contact or switch 325 in a closed position. Coil 370 includes an internal spring that causes the switch 325 to open when current ceases to flow through coil 370. When switch 325 opens, the primary circuit 321 is interrupted and current no longer flows through the primary side circuit 321. Current flows in the primary circuit 321 when plug 320 is connected to the mains and when switch or contact 325 is closed due to the relay coil 370 being energized. To start current flow in charging device 300, plug 320 will be plugged into a power source (i.e., typically a household outlet such as a wall socket 525 shown in FIG. 11). With a load 340 attached to charging device 300 the manual switch 322 (i.e., a momentary switch, in the present example, corresponding to push button 140 of FIG. 1) is engaged with some force or actuation from a user which starts or allows current to flow through the primary side circuit 321. This primary side current flow will cause current to also flow through the secondary coil 318. With a load 340 attached to a connector or jack J1, current will flow to the load 340 and through the secondary-side circuit 331, saturating the solid state switch (i.e., transistor 360) and energizing the relay K1. Current flowing through coil 370 closes the contact or switch 325 and restores current flow through the primary-side circuit 321, even after momentary switch 322 has reopened.

Once current flow in the primary side circuit 321 and secondary-side circuits 331, has been restored, the transistor 360 will remain in saturation as long as the load 340 continues to be connected to the secondary circuit 331 and the plug 320 is connected to the mains, thus charging the load 340. Once the load device 340 stops drawing enough current to turn-on the transistor 360 (or drops out of the circuit entirely), the transistor 360 turns off, current stops flowing through the coil 370, the contact 325 opens and current flow through the primary-side circuit 321 is interrupted until a load 340 is again attached and switch 322 is manually pressed.

More particularly, when load 340 is disconnected or there is a drop in current flow in the secondary circuit 331 that meets a threshold current level (i.e., below the turn-on threshold of the transistor 360) transistor 360 turns off, causing the magnetic coil 370 to lose power, and switch/contact 325 opens. When switch 325 opens there is no longer current flow in primary-side circuit 321 and power is no longer taken or drawn from the mains. Though charging device 300 is still connected to the power source or plugged into the wall or other power source, there is no current flow in the primary circuit 321 because switch 325 is open and the circuit 321 has been effectively disconnected from the mains.

As discussed above, to reconnect the charging device 300 to the mains, switch 325 in primary-side circuit 321 must be re-closed by restoring current flow in the primary-side circuit 321, via a manual actuation, required from a user, of button 322.

Figure 4A:
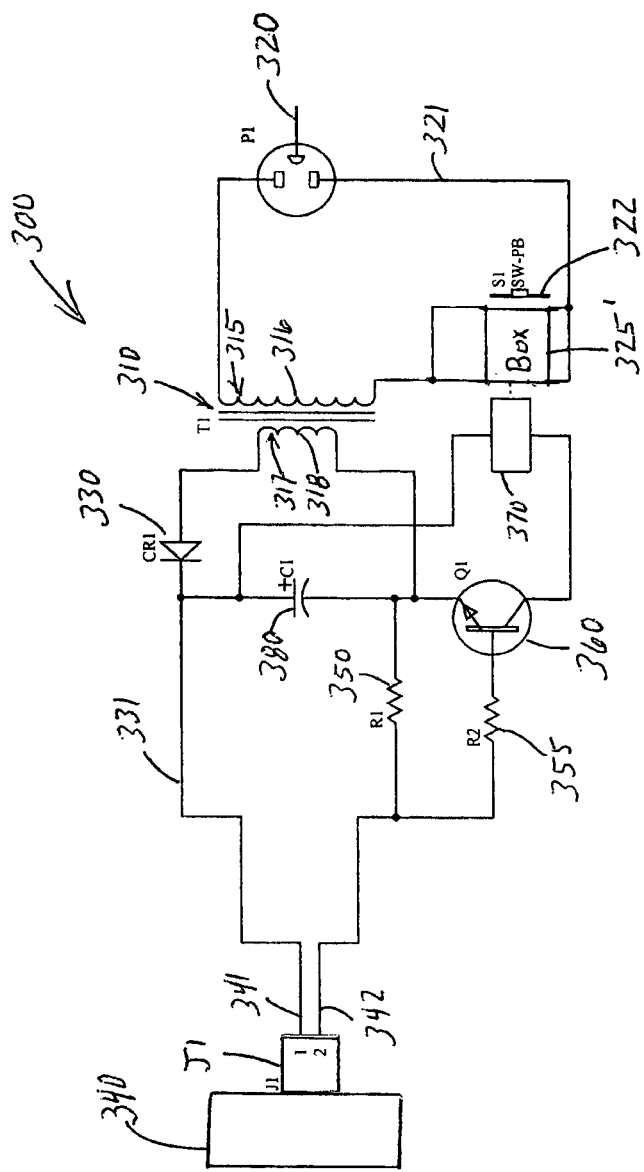
FIG. 4A is a circuit diagram substantially similar to that of FIG. 4, wherein the switch 325 of FIG. 4 is represented generically by box 325', which includes an electrical arrangement that can perform the same function as the switch 325 and/or switch 320 of FIG. 4.

The circuit of FIG. 4A is substantially similar to that of FIG. 4, except that switch 325' can be any type of switch actuated by coil 370 of the secondary-side circuit 331. Thus, switch 325' is shown generically in "black box" form, since the switch 325' can be any number of circuits or solid state devices, including the double-pole double-throw switch 145 described in connection with FIGS. 2 and 3.

Figure 5:
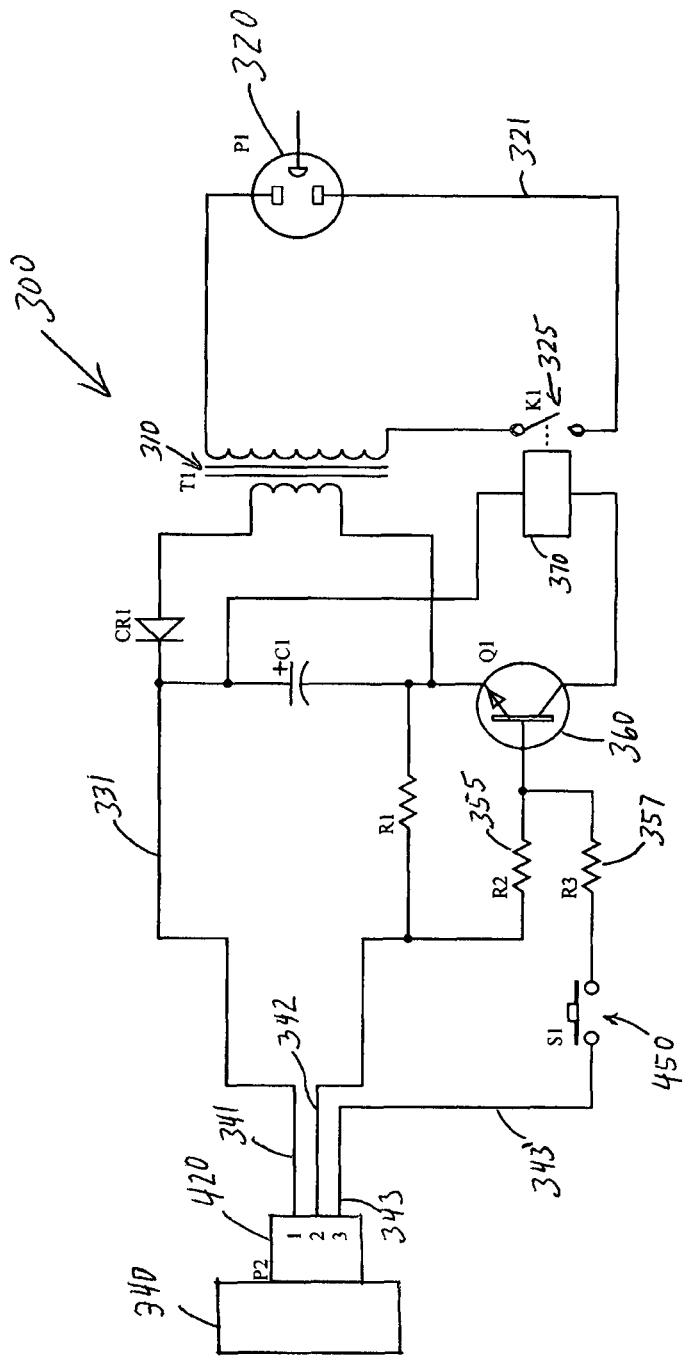
FIG. 5 is a circuit diagram showing one particular embodiment utilizing an electro-mechanical switch to interrupt the primary side circuit of the charging device in order to open and disconnect the primary side circuit from the mains and a momentary switch in the secondary side circuit to that initiates closing of the electro-mechanical switch to restore current flow to the primary side circuit from the mains.
Figure 7:
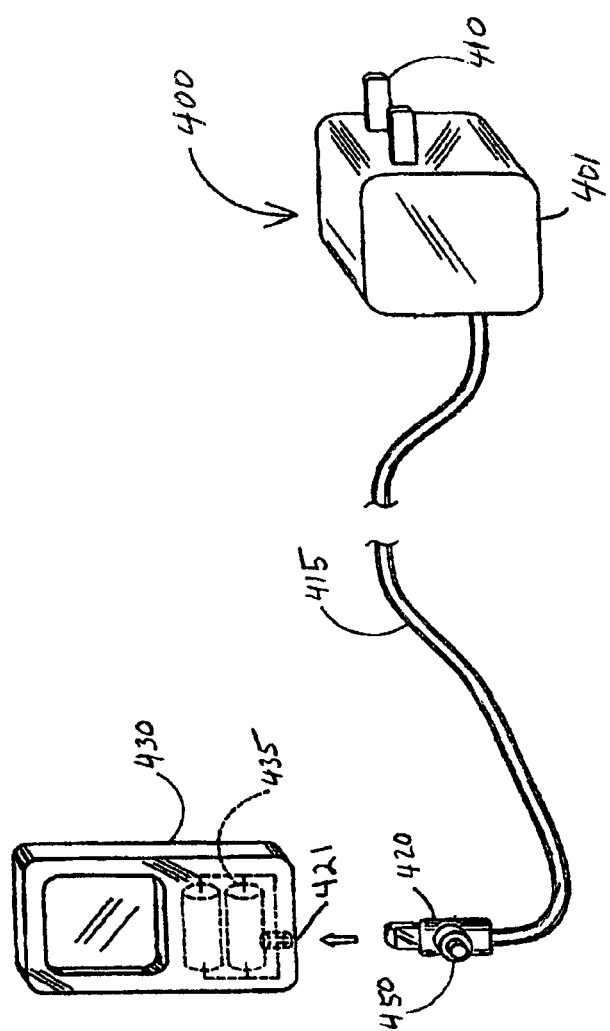
FIG. 7 is an isometric view of an alternate embodiment of the charging device of the instant invention wherein the manual switch to activate the closing of the electro-mechanical switch in the primary circuit is located at or near the connector jack that mates with the load.

Referring now to FIGS. 5 and 7, there is shown a circuit in accordance with another embodiment of the invention. In the circuit of FIG. 5, the manually actuated button or momentary switch 450 is located on the connector or jack 420 in close proximity to the load 340—in the current example, a cell phone 430, as shown more particularly in FIG. 7. Jack 420 plugs into receptacle 421 at the base of phone 430. In this embodiment, the charging device 300 shown in FIGS. 5 and 400 in FIG. 7 has an activation switch 450 that is located at the point of use where the jack 420, the distal end of the charger cord 415 is engaged or plugged into load 340 for example a cell phone 430 having a rechargeable battery 435. In this embodiment, the plug 320 can remain plugged into the mains. When the load 340 is disconnected from the connector 420 of the secondary-side circuit 331, the transistor 360 turns off and the relay K1 is de-energized (i.e., current stops flowing through coil 370 and contact 325 opens). Thus, the primary-side circuit 321 is interrupted (i.e., opens) when switch 325 opens, as previously described in connection with FIG. 4, and the charging device 300 is effectively disconnected from the mains though plug 320 remains plugged into the mains or wall socket.

When it is desired to charge the rechargeable batteries 435 of load 430, the connector 420 is plugged into a mating connector 421 of the load 430, and activation switch 450 is depressed when the load 340 or phone 430 is connected to the jack 420 and to the secondary circuit 331. Then the primary circuit 321 will be energized with current flow and the charging device will begin charging the load.

In the embodiment illustrated in FIGS. 5 and 7, where the activation switch 450 is located at the distal end of charger cord 425, a circuit includes switch 450 and a third resistor 357. This circuit obtains power from the device 430 (FIG. 7) or load 340, via a pin 343 on the connector or jack 420. For example, residual power in the batteries 435 of a load 340 such as a cell phone 430 is provided to the base of the transistor 360 via a pin 343 of the connector 420 and a wire connection 343' closed by actuation of momentary switch 450. Though the cell phone 430 may have lost its full charge and may not be usable as a cell phone because the battery 435 has become substantially discharged and no longer a sufficient power threshold to operate the phone 430. However there is likely in most situations a sufficient threshold or residual voltage remaining in the battery 435 to provide sufficient current for an instant, to the base of the transistor 360 when switch 450 is activated or pressed, so as to activate coil 370 and close switch 325. This restores the current flow through the primary-side circuit 321 and activates the charging device 300 to charge the load 340 or cell phone 430.

Figure 6:
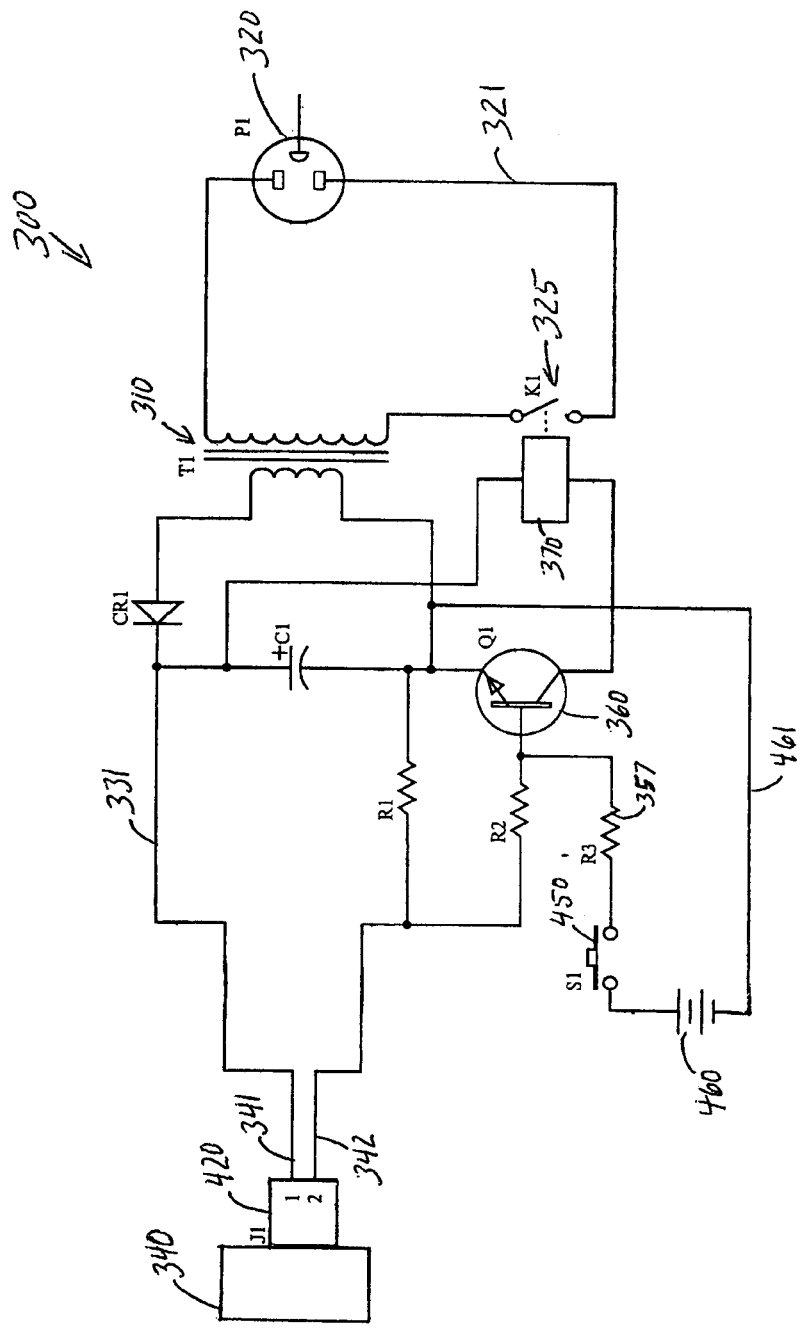
FIG. 6 is a circuit diagram showing a further particular embodiment of the invention wherein the mechanical switch is an electro-mechanical switch in the primary side circuit of the charging device to open and effectively disconnect the primary side circuit from the mains, and a momentary switch in the secondary side circuit to initiate closing of the electro-mechanical switch in the primary circuit to reconnect the charging device once interrupted and wherein the power for the momentary switch in the secondary side circuit is from a power source in the secondary circuit.

Referring now to FIGS. 6 and 7, there is shown a further embodiment of the present invention. In the present embodiment, the activation switch 450 is at the distal end of cord 415, as shown in FIG. 7, but the power provided to the base of transistor 360 by the closing of the switch 450 is provided by a small battery 460, such as a hearing aid battery or other long life battery in the circuit of FIG. 6. This battery 460 can be located in the area of the jack 420 or in the casing or housing 401 for the other electrical components of charger device 400. In this embodiment, when switch 450 is manually closed, the current in the battery 460 is provided to the base of the transistor switch 360, for a moment, momentarily energizing the coil 370 and initiating the closing of the switch 325. Once switch 325 is closed, current flow is restored through the primary-side circuit 321 and, consequently, through the secondary-side circuit 331, despite the momentary switch 450 opening and the battery 460 dropping out of the circuit. Thus, power to the charging device 300 can be interrupted and restored without ever removing or reinserting the plug 320 into the wall outlet or mains.

Figure 6A:
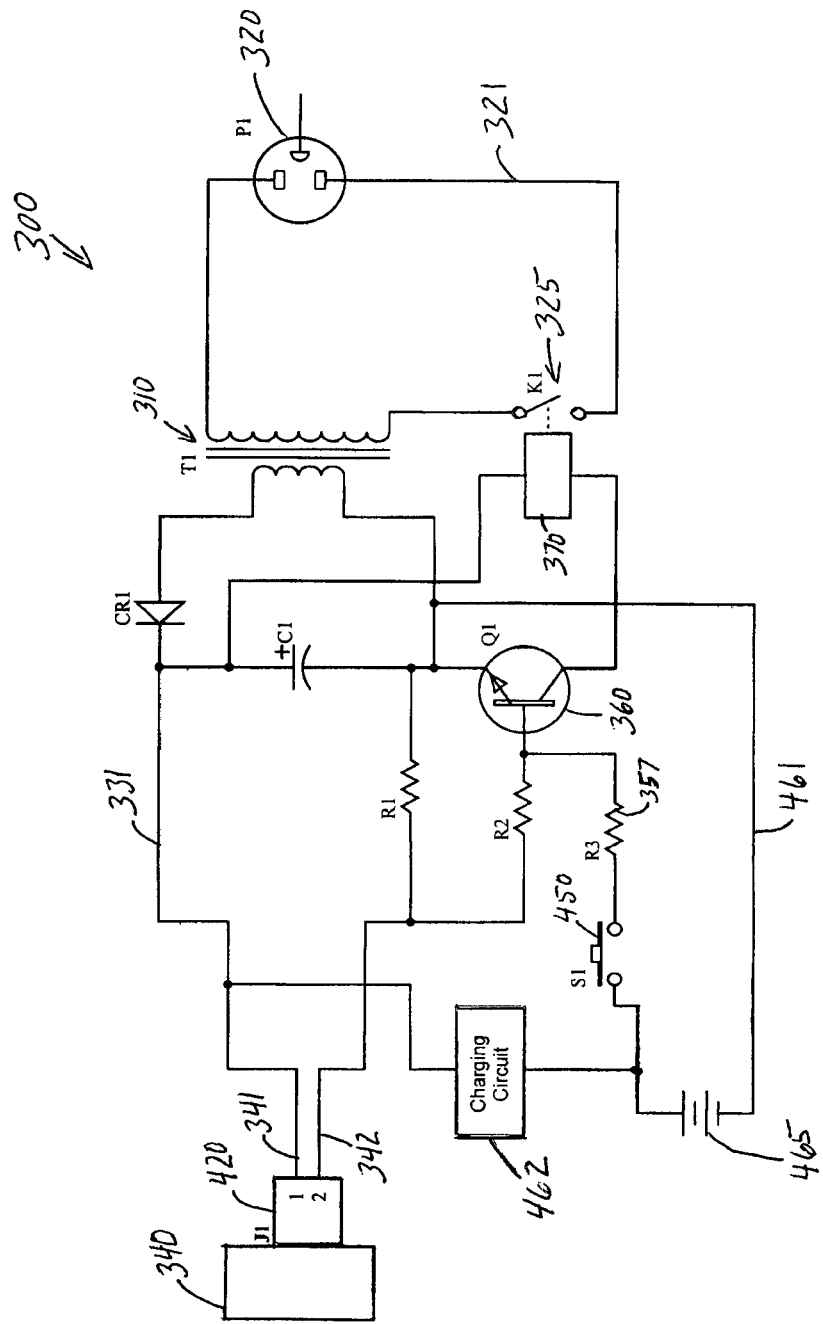
FIG. 6A is an alternative embodiment similar to FIG. 6, where the power source in the secondary circuit is a rechargeable battery.

Referring now to FIGS. 6A and 7, there is shown another alternate embodiment of the invention, similar to that of FIG. 6, wherein the activation switch 450 is at the distal end of cord 415, but wherein the power applied to the circuit by manually closing the momentary switch 450 is provided by a rechargeable battery 465. Additionally, the circuit 331 of FIG. 6A includes a charging circuit 462 for recharging the rechargeable battery 465 when current flows through the secondary circuit 331 to the load 340. In this way, rechargeable battery 461 will have sufficient power at all times to turn-on transistor 360 and energize the coil 370 when switch 450 is activated or closed.

Figure 8:
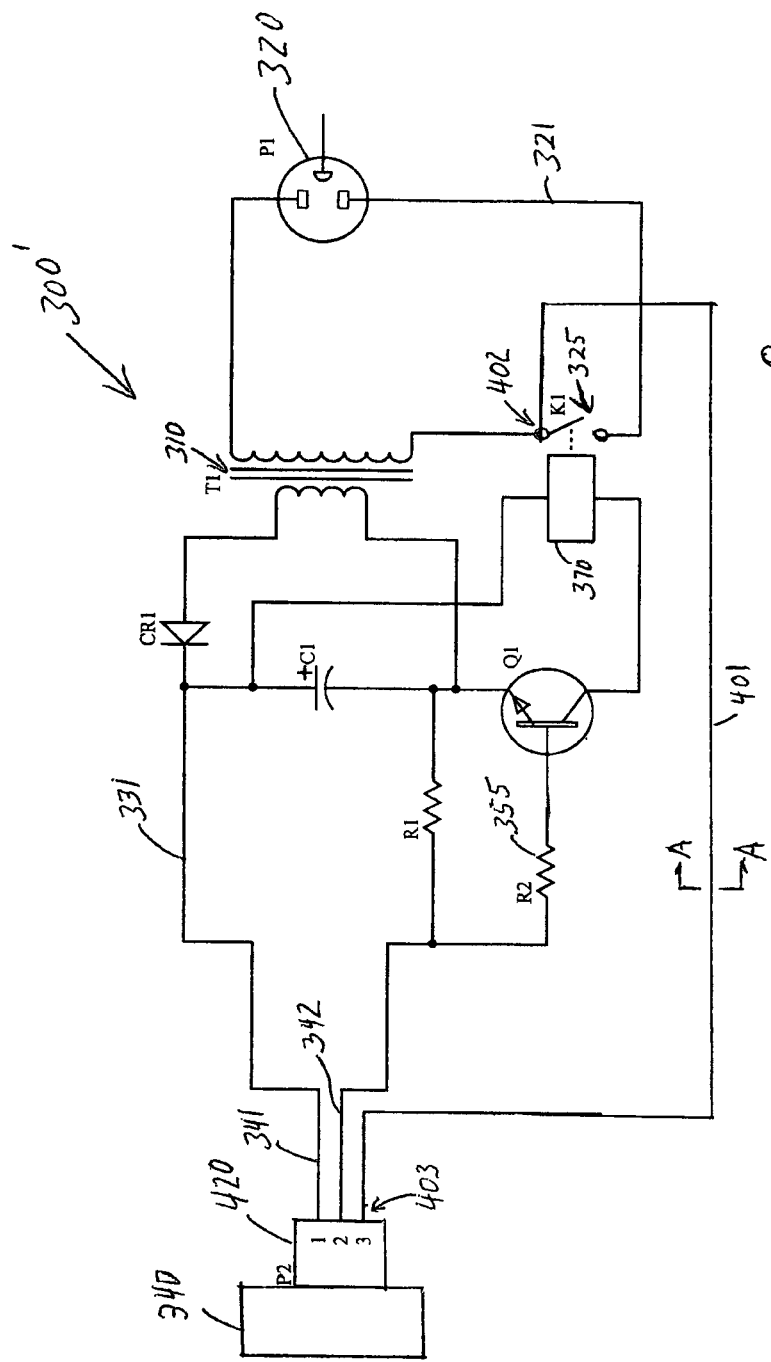
FIG. 8 is a diagram showing a circuit of one embodiment having an electro-mechanical switch in the primary side of the charging device to open and disconnect the primary side circuit from the mains and a fluid pusher at or near the location of the load or the connection jack to activate the closing of the electro-mechanical switch in the primary circuit to reconnect the charging device once disconnected where the fluid pusher connects to a fluidics tube to activate and communicate with the electro-mechanical switch located in the primary side of the charging device.

Referring now to FIGS. 7-10, there is shown a further embodiment of the present invention, wherein the activation switch 450 at the distal end of cord 415 of FIG. 7 is provided as an activation switch or fluid pusher 403 at the connector to load 340 of FIG. 8. In the present particular embodiment, the switch or contact 325 is physically pushed and forced closed by a mechanical pusher 402, actuated by a fluid within a fluidic tube 401, initiated by pushing the fluid pusher 403. The fluid, may be air or a liquid such as oil or other liquids, can be contained in a fluidic tube 401 in fluid communication with the fluid pusher 403, which could be a bulb or similar device located at a first end of tube 401. Actuation of the fluid pusher forces the fluid to apply pressure to the mechanical pusher 402 at a second end of tube 401. Tube 401 can be housed within charging cord 415' as shown in FIG. 10. The cross section of tube 401 taken from lines A-A in FIG. 8 is shown in FIG. 9 and a cross section of a charging cord 415' with electrical connectors 341 and 342 for the load 340 and the fluidic tube 401 is shown in FIG. 10. Bulb 403 and pusher 402 are in fluidic communication through tube 401 such that any movement of fluid caused by squeezing or pressing bulb 403 causes a similar movement at pusher 402 that for example could push switch 325 to a closed position or an arm connected to switch 325 that would close switch 325 and close the circuit 321 to start current flow in primary circuit 321.

Referring now to FIG. 11, there is shown a further embodiment of the invention wherein a charging device 505 is provided for charging a laptop computer 500. The charging device 505 operates substantially similarly to the charging devices described in connection with FIGS. 4, 6 and 6A, wherein the manually actuable reset button 530 is disposed at the charging device 505, but wherein the charging device is remote from the wall socket 525, and thus more accessible. More particularly, button or switch 530 is remote from receptacle 525 in wall socket 525. Laptop 500 includes a keyboard 501, a display screen 502 and a receptor or jack 503 for receiving a mating jack 510 from charging device 505. Charging device 505 includes, at a first side, electrical cable 515 at its distal end 517 connected to an electrical plug 519 and prongs 410 to plug into an electrical source of energy, like a wall outlet 525 having a first receptacle and a second receptacle 526 for receiving plug 519. Charging device 505 has at its other end, an electrical cable 516 with a jack 510 at its distal end. Jack 510 is configured to mate with receptacle 503 on the laptop computer 500.

Additionally, the charging device 505 includes a manually actuable button 530 that, when depressed, will restore current flow to the primary-side circuit, as described in connection with the embodiments of the invention discussed hereinabove.

Generally, the present invention includes a charging device having a plug and a jack for connection to a load such as a cell phone. Initially, the plug will be plugged into a wall outlet or other power source and the jack will be plugged into the load or cell phone and then the switch or button will be depressed in order to cause current to flow in the primary transformer circuit of the charging device. When the load is charged or is disconnected, the current flow in the secondary transformer circuit will drop down to a threshold level causing the switch in the primary circuit to open and the charging device will no longer draw power or current from the electrical source or mains. When it is desired to use the charging device again the above will be repeated. If the plug is still plugged in the wall then that step of plugging in the plug will not have to be repeated and if the load is still connected to the charging device, the plug will not have to be electrically attached again. However, the switch will be required to be activated or pressed in order to cause current to flow in the primary circuit again.

Further the present invention is a method for disconnecting a charging device including a transformer, having a first switch in the primary-side circuit of the primary coil of the transformer; and opening the switch when a current sensing device determines there has been a decrease of current flow in the secondary-side circuit of the transformer, and manually actuating a switch to permit current flow in the primary-side circuit.

The present invention is also a charging device, having a transformer including a primary-side circuit and a secondary-side circuit, with the primary-side circuit including a first switch having an open state that opens said primary-side circuit to current flow and a closed state that permits current flow through said primary-side circuit, the secondary-side circuit including a connector for connection to a load for charging an energy storage device in said load, and a switching device in said secondary-side circuit for switching the first switch to its open state when the current drawn by said load is below a preset threshold.

Note that the above-described embodiments are exemplary and that the above invention is not meant to be limited only to its preferred embodiments. It can be seen that other modifications can be made to the preferred embodiments and still be within the spirit of the present invention.

We claim:

1. A method for disconnecting a charging device including a transformer, comprising:
   providing a first switch in the primary-side circuit of the primary coil of the transformer; and
   opening the first switch when a current sensing device determines a decrease of current flow in the secondary-side circuit of the transformer, and
   manually actuating a switching element to permit current flow in the primary-side circuit.

2. The method of claim 1, wherein the switching element in the manually actuating step is the first switch.

3. The method of claim 1, wherein the first switch is part of a relay or other electromechanical switch.

4. The method of claim 3, wherein the first switch is a relay contact in the primary-side circuit closed by a relay coil in the secondary-side circuit that is energized when a solid state switching device is turned-on.

5. The method of claim 3, wherein the switching element in the manually actuating step is a momentary switch different from the first switch.

6. The method of claim 3 wherein the switching element in the manually actuating step is a fluid pusher using a fluidic force to close the first switch.

7. The method of claim 1, wherein the switching element in the manually actuating step is disposed in the primary-side circuit of the transformer.

8. The method of claim 1, wherein the switching element in the manually actuating step is disposed in the secondary-side circuit of the transformer.

9. The method of claim 8, wherein said secondary-side circuit includes a battery that provides power to initiate closing of the first switch when the switching element in the manually actuating step is closed.

10. A charging device, comprising:
    a transformer including a primary-side circuit and a secondary-side circuit;
    the primary-side circuit including a first switch having an open state that opens said primary-side circuit to current flow and a closed state that permits current flow through said primary-side circuit;
    the secondary-side circuit including a connector for connection to a load for charging an energy storage device in said load;
    a switching device in said secondary-side circuit for switching the first switch to its open state when the current drawn by said load is below a preset threshold;
    a manual switch actuable to switch said first switch from an open state to its closed state.

11. The charging device of claim 10, wherein the first switch is part of a relay or other electromechanical switch.

12. The charging device of claim 11, wherein the first switch is a relay contact in the primary-side circuit closed by a relay coil in the secondary-side circuit that is energized when a solid state switching device is turned-on.

13. The charging device of claim 10, wherein the switch in the manual switch is a momentary switch different from the first switch.

14. The charging device of claim 10 wherein the manual switch is a fluid pusher using a fluidic force to close the first switch.

15. The charging device of claim 10, wherein the manual switch is disposed in the primary-side circuit of the transformer.

16. The charging device of claim 10, wherein the manual switch is disposed in the secondary-side circuit of the transformer.

17. The charging device of claim 10, wherein said secondary-side circuit includes a battery that provides power to initiate closing of the first switch when the manual switch is closed.

18. The charging device of claim 10, wherein the manual switch is a momentary switch that restores current flow in the primary-side circuit.

19. The charging device of claim 10, wherein the manual switch temporarily provides power to a solid state switching device in the secondary-side circuit to cause said first switch to close and restore current flow to both said primary-side and secondary-side circuits.

20. The charging device of claim 19, wherein the first switch is a contact of a relay, an energizing coil of said relay being disposed in said secondary-side circuit, and said solid state switching device is a transistor that, when switched on, energizes said energizing coil to close said contact.

* * * * *